July 21, 1925.
S. SOLOMON
STEERING WHEEL HEATER
Filed May 31, 1924
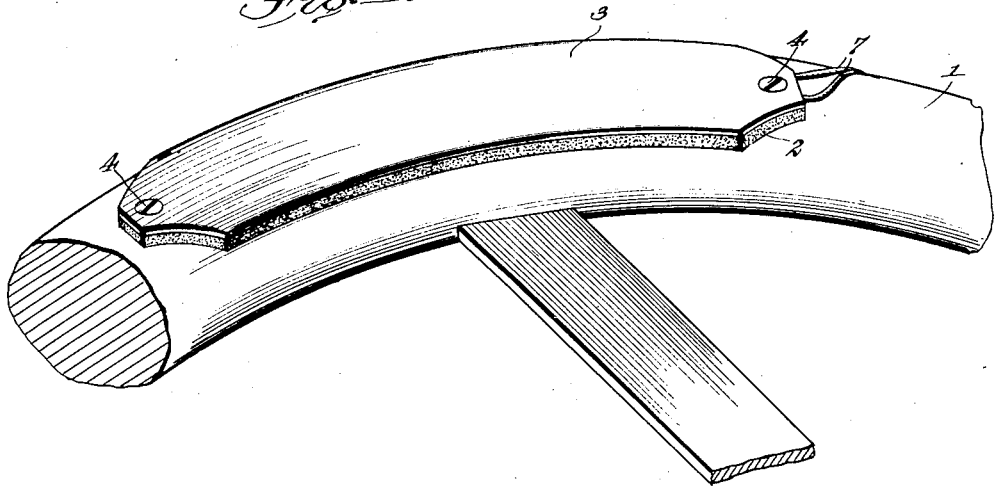
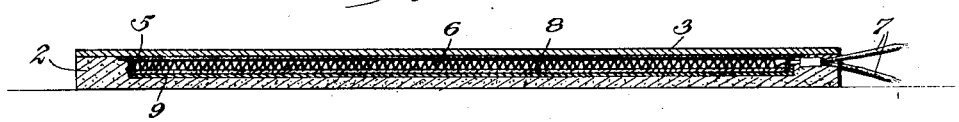
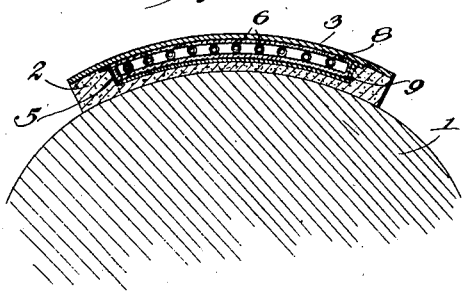
WITNESSES
INVENTOR
Samuel Solomon,
BY
ATTORNEYS Patented July 21, 1925.

1,546,413

UNITED STATES PATENT OFFICE.

SAMUEL SOLOMON, OF FOSTORIA, OHIO.

STEERING-WHEEL HEATER.

Application filed May 31, 1924. Serial No. 717,092.

*To all whom it may concern:*

Be it known that I, SAMUEL SOLOMON, a citizen of the United States of America, and resident of Fostoria, in the county of Seneca and State of Ohio, have invented certain new and useful Improvements in Steering-Wheel Heaters, of which the following is a specification.

My invention is an improvement in automobile steering wheel heaters, and it consists in the combinations constructions and arrangements herein described and claimed.

An object of the invention is to provide a simple, reliable and efficient heater which is adapted to be secured on the steering wheel of an automobile in position to impart warmth to the hands of the operator of the automobile.

A further object of the invention is to provide a heater of the character described which will not interfere with the manipulation in the usual manner of a steering wheel to which it is applied nor detract from the appearance of the steering wheel.

Other objects and advantages of the invention will be apparent from the following description considered in conjunction with the accompanying drawings, in which Figure 1 is a fragmentary perspective view of a steering wheel equipped with a heater embodying the invention, Figure 2 is a longitudinal vertical section through the heater, and Figure 3 is a transverse vertical section through the heater and through a fragmentary portion of the steering wheel on which the heater is supported.

In Figures 1 and 3, the numeral 1 designates the annular grip member of a steering wheel of ordinary construction.

In carrying out the invention, I provide a base or pad 2 made of any suitable material which is a poor conductor of heat such as asbestors. The base 2 is curved transversely and longitudinally to closely contact at all points on its lower face with the upper face of a portion of the annular grip member 1 of the steering wheel. A cover plate 3 having the same width length and configuration as the base 2 is superimposed on the latter. The cover plate 3 and the base 2 may be secured to each other and to the grip member 1 by screws 4 projected through openings in the end portions of the base and the cover plate into the annular grip member or by an other suitable known fastening means. The plate 3 is made of metal or other material having good heat conducting qualities.

An electric heating element is disposed between the base and the cover plate, preferably being disposed in a suitably formed cavity or depression 5 in the upper face of the pad 2, as clearly shown in Figures 2 and 3. The heating element may comprise one or more coils or lengths of resistance wire 6 of suitable size and material to provide the desired heat when the heating element is connected electrically, as by means of electrical conductors such as indicated at 7 with a convenient source of electric current supply. The wires 6 are housed within a casing 8 of electrical insulating material, such as porcelain, which is a good conductor of heat. The casing 8 is disposed in the cavity 5 which may be lined with a thin gauge metal as indicated at 9 in Figures 2 and 3, the lining being in contact at its marginal edges with the cover plate 3.

From the foregoing description of the various parts of the device, the operation thereof will be readily understood. Heat from the heating element between the pad or base 2 and the cover plate 3 is imparted to the latter and thence to the hands of the operator of an automobile having the steering wheel on which the heater is secured. No heat will pass to the annular grip member 1 since the latter is insulated from the heating element by the base or pad.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. A device of the character described comprising a base made of heat insulating material and adapted to be disposed on the grip member of an automobile steering wheel and to extend only part of the distance around the body of the grip member, said base having a cavity in its outer face, a cover plate made of a material having good heat conducting qualities, means whereby said base and said cover plate can be secured to each other and to said grip member, and a heating element disposed between said base and said cover plate, said base and said cover being curved longitudinally and transversely to conform to the curvature of the outer wall of the grip member of the steering wheel.

2. A heater comprising a base made of a heat insulating material and adapted to be disposed upon a portion of the grip member of an automobile steering wheel, said base having a cavity in its upper face, a heat conducting cover plate for the base, means for securing said cover plate and said base together and to the underlying portion of the steering wheel grip member, an electric heating element disposed in said cavity, and electrical conductors extending from said heating element between said base and cover plate.

3. A heater comprising a base made of a heat insulating material and adapted to be disposed upon a portion of the grip member of an automobile steering wheel, said base having a cavity in its upper face, a heat conducting cover plate for the base, means for securing said cover plate and said base together and to the underlying portion of the steering wheel grip member, and an electric heating element disposed in said cavity, and electrical conductors extending from said heating element between said base and cover plate, said heating element comprising an electrical resistance unit and a casing of heat conducting electrical insulating material.

SAMUEL SOLOMON.